(No Model.)
W. JOHNSTON
UNIVERSAL JOINT COUPLING.
No. 259,399. Patented June 13, 1882.
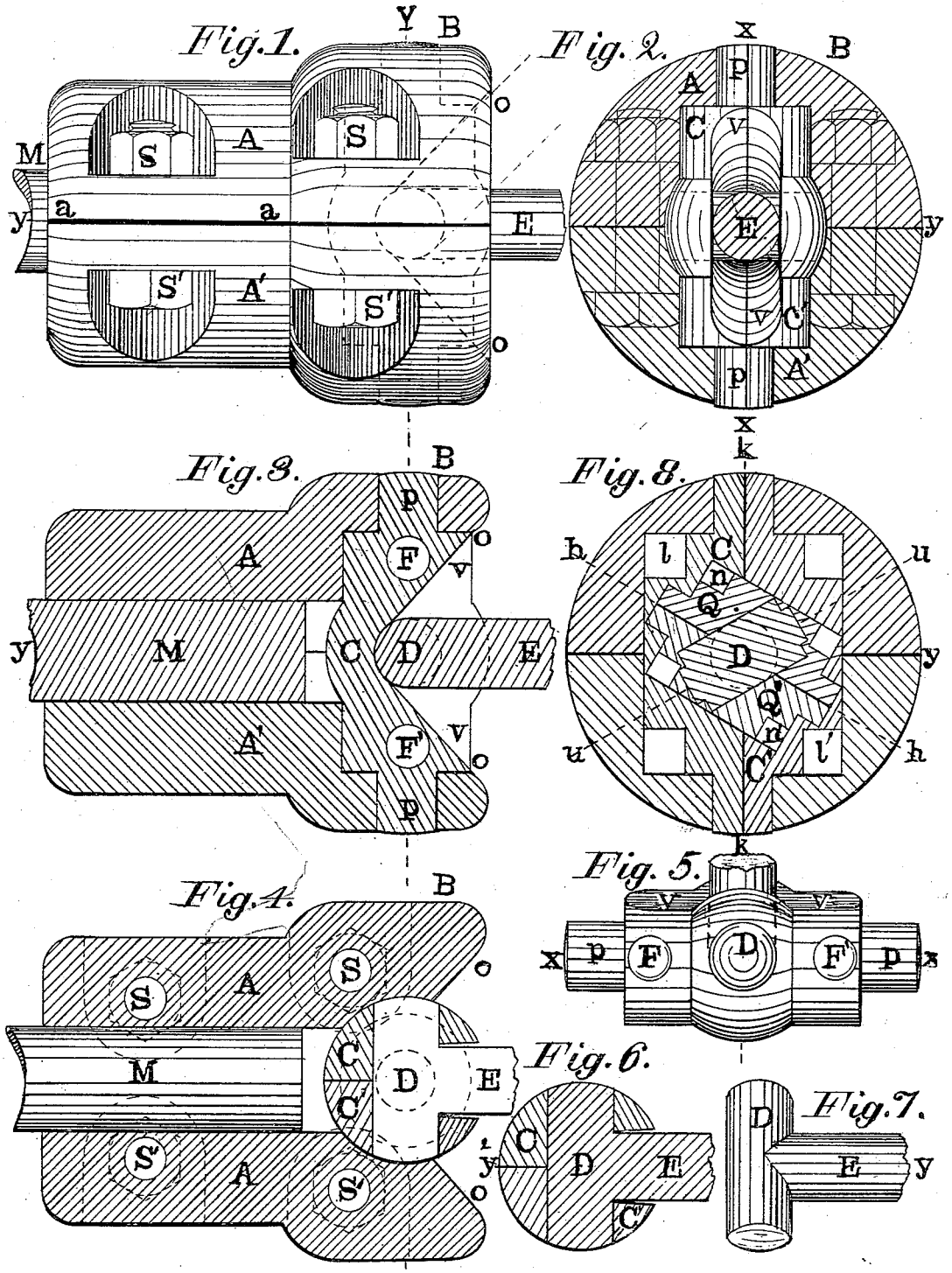
WITNESSES:
INVENTOR:
William Johnston j# UNITED STATES PATENT OFFICE.

WILLIAM JOHNSTON, OF PHILADELPHIA, PENNSYLVANIA.

UNIVERSAL-JOINT COUPLING.

SPECIFICATION forming part of Letters Patent No. 259,399, dated June 13, 1882.

Application filed October 18, 1881. (No model.)

*To all whom it may concern:*

Be it known that I, WILLIAM JOHNSTON, a citizen of the United States, residing at Philadelphia, in the county of Philadelphia and State of Pennsylvania, have invented certain new and useful Improvements in Universal-Joint Couplings for Connecting Shafts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of shaft-couplings which are employed to transmit power from one end of a rotating shaft to the end of another, and at the same time to allow the shafting perfect freedom of motion in every direction and at any angle within certain limits.

The objects of my improvements are, first, to render the construction and operation of such couplings more durable and compact; second, to reduce the friction of their working parts and make them stronger therein; third, a simple construction, easily connected or disconnected from the shafting when required; and, fourth, a noiseless transmission of motive power in any direction, and without backlash or play between the working parts, so much objected to in miter or bevel gearing; and to this end the invention consists in the devices and in the mechanical combinations illustrated in the annexed drawings, and more fully described in the specification and pointed out in the claims.

In the accompanying drawings, Figure 1 represents a side elevation of the coupling embodying my invention. Fig. 2 represents a vertical cross-section taken through the same on line Y' of Fig. 1. Fig. 3 represents a longitudinal vertical section of the same on line x x of Fig. 2. Fig. 4 represents a horizontal longitudinal section of the same. Figs. 5, 6, and 7 are detail views of the several parts of the coupling, and Fig. 8 represents a cross-section of a modification of said coupling.

Similar letters refer to similar parts throughout the several views.

In the drawings, A A' represent the cylindrical shell of the coupling, which is made in two parts, the upper half, A, and the lower half, A', joining in the central line, y y, and held firmly together by bolts and nuts S S', Figs. 1 and 4, there being a recess in the shell, so the bolt-heads and nuts do not project outward. The head B of the cylindrical shell is somewhat larger at its front end. The cylinder A A' has a bore through its longitudinal center to admit the end of a shaft to be fastened into it by tightening the after screw-bolts S S', and for the same purpose, also, a small opening is left at a a, Fig. 1, between the two halves, so it will hold the shaft M firmly in its center, and for that purpose the bore in the socket is also made a little smaller than the end of the shaft to be fastened into it. The front end of the cylindrical socket, being larger, forms the head B, said head having a conical opening, o o, Figs. 1, 3, and 4, in the shape of the letter V, and forming an angle somewhat larger than ninety degrees of an arc, so shaft E can move freely in any direction within that angle.

In the head B a cylinder, C C', is inserted in line x x, movable on its own axis and crossing line y y at right angles. This cylinder is made in two halves, C and C', to admit a smaller cylinder, D, to cross it at right angles through its center. Cylinder C C' has a V-shaped longitudinal opening, V V, Figs. 3, 4, and 5, commencing near its center and extending outward as far as the conical opening o o in head B, Figs. 3 and 4. The diameter of cylinder C C' is enlarged around the middle part of its center to compensate for the boring made in it to admit the smaller cylinder, D, crossing it in its center, and also to give it more bearing-surface for this cylinder to work in. The larger cylinder, C C', is reduced in diameter at p p, Figs. 2, 3, and 5, so there can be no lateral motion of it when working, also not to weaken the casing or head B. The smaller cylinder, D, I prefer to forge in one piece in union with a short piece of shaft, E, in the form of letter T, Figs. 4, 6, and 7, which can then be coupled onto any length of shafting or connected with another coupler of the same kind if it is desired to work shafting at right angles to each other. It will be seen that by inserting this smaller cylinder, D, into the two halves of cylinder C C' it is at liberty to move to and fro on its center in connection with its shaft E as far as the opening V V, Figs. 2, 3, and 5, will permit. The two halves of the larger cylinder C C', after admitting the cylinder D in connection with shaft E, are then fastened together by bolts F F', and then inserted into the two halves of the head B of the casing A A', the two parts of which are then rigidly held together by bolts and nuts S S', Figs. 1 and 4. It will be seen that the cylinder C C' has freedom to oscillate in the direction of the line o o until stopped by the contact of shaft E with head B at the conical opening of said head; also, that cylinder D and shaft E are at liberty to move in a plane at right angles with the plane of motion of cylinder C C' until similarly stopped by the head B, and therefore the shaft E has the necessary motion in either direction within said connection.

Fig. 8 is a cross-section in line x x of a modification of the ordinary arrangement of the inner working-cylinders of the foregoing, and which in this case has three cylinders—the first in line k k, cylinder C C'; the second in line h h, cylinder Q Q', and the third and last one, D, in connection with its shaft, as fully described by reference to the foregoing description of Figs. 1 to 7, the main difference between the two devices consisting in the number of working-cylinders, whereas in the first-named coupler, the cylinders crossing each other at right angles in the latter, Fig. 8, the three cylinders crossing each other at an angle of sixty degrees in lines k k, h h, and u u, cylinders C C', Q Q', and D, in connection with its shaft, the same as described in the first part of this specification. The halves of cylinders C C' and Q Q' are held together by forcing or shrinking rings l l' and n n' on their ends onto shoulders left for that purpose. It will also be seen that more than three cylinders could be employed, if so desired, by a similar arrangement by reducing the angles formed by the arc h, k, and u, Fig. 8. The object of employing more than two cylinders is to be able to run at a very high speed of rotation, as then there will be less work thrown on each separate cylinder, making the universal joint more flexible.

In the construction of these couplers I prefer to make the outer casing, A A', of good cast-iron, the inner larger cylinder, C C', of phosphor-bronze, steel, or malleable iron, and the cylinder D, in connection with its shaft E, out of cast-steel, to resist wearing, as also to resist torsional strain, so as to correspond in strength with the wrought-iron driving-shaft M, which is of a larger diameter than shaft E.

I am aware that prior to my invention ordinary shaft-couplings have been made in two sectional parts and held together by screw-bolts for the purpose of connecting straight shafting. I therefore do not claim such a combination as my invention, broadly; but What I do claim as my invention, and desire to secure by Letters Patent, is—

1. In shaft-coupling, a sectional cylinder, in combination with a smaller cylinder which it incloses, and a head having a flaring mouth within which said cylinders turn in planes at right angles to one another, for the purpose set forth.

2. In combination with head B and shaft E, a cylinder, D, to which said shaft is attached, and a larger cylinder inclosing the same, said larger cylinder having a flaring or V-shaped opening to allow the play of said shaft, substantially as set forth.

3. A shaft and coupling head, the latter having a V-shaped opening, in combination with two or more cylinders, which form connections between them and allow said shaft to be inclined in as many different planes as there are cylinders.

WILLIAM JOHNSTON.

Witnesses:
CHS. F. THOENER,
L. B. THOENER.